United States Patent
Assan

(10) Patent No.: US 7,355,360 B2
(45) Date of Patent: Apr. 8, 2008

(54) METHOD FOR OPERATING A WIPER SYSTEM, AND CORRESPONDING WIPER SYSTEM

(75) Inventor: Jean Assan, Stuttgart (DE)

(73) Assignee: Valeo Wischersysteme GmbH, Bietigheim-Bissingen (DE)

( * ) Notice: Subject to any disclaimer, the term of this patent is extended or adjusted under 35 U.S.C. 154(b) by 492 days.

(21) Appl. No.: 10/524,362

(22) PCT Filed: Jul. 28, 2003

(86) PCT No.: PCT/EP03/08294

§ 371 (c)(1),
(2), (4) Date: Feb. 11, 2005

(87) PCT Pub. No.: WO2004/022392

PCT Pub. Date: Mar. 18, 2004

(65) Prior Publication Data

US 2005/0242762 A1 Nov. 3, 2005

(30) Foreign Application Priority Data

Aug. 17, 2002 (DE) ................................ 102 36 887

(51) Int. Cl.
*H02P 7/00* (2006.01)

(52) U.S. Cl. ...................... 318/280; 318/283; 318/286; 318/466; 318/DIG. 2; 15/250.12

(58) Field of Classification Search ............ 318/66–68, 318/280–286, 466–468, DIG. 2; 15/250.001, 15/250.12, 250.13
See application file for complete search history.

(56) References Cited

U.S. PATENT DOCUMENTS

| 4,665,488 | A |   | 5/1987 | Graham et al. |         |
|-----------|---|---|--------|---------------|---------|
| 5,545,956 | A | * | 8/1996 | Salvio et al. | 318/283 |
| 5,929,588 | A | * | 7/1999 | Shiah         | 318/653 |

FOREIGN PATENT DOCUMENTS

| DE | 3707233 A1 | 9/1988  |
|----|------------|---------|
| DE | 3908293 A1 | 9/1989  |
| EP | 0952056 A2 | 10/1999 |

* cited by examiner

*Primary Examiner*—Rina Duda
(74) *Attorney, Agent, or Firm*—Osha Liang LLP

(57) ABSTRACT

The invention relates to a method for operating a wiper system, especially an opposed wiper system or a butterfly wiper system, and to a wiper system comprising at least two motor units which are coupled to wiper blades and can be independently driven, a control appliance for controlling the motor units, and sensor units which are coupled to the control appliance and are used to determine the angular position of the wiper blades. The invention is characterised in that the wiping angle of the wiper blades is divided into areas, the area containing the respective wiper blade being determined along with the angle of the wiper blade inside the respective area.

21 Claims, 3 Drawing Sheets

METHOD FOR OPERATING A WIPER SYSTEM, AND CORRESPONDING WIPER SYSTEM

BACKGROUND OF THE INVENTION

The invention relates to a method of operating a wiper system and to a wiper system, in particular a counter-rotation or butterfly wiper system, comprising at least two motor units which can be driven independently of one another and are coupled to wiper arms for holding wiper blades, a controller for controlling the motor units, and sensor units for determining the angular position of the wiper arms, said sensor units being connected to the controller.

Such methods and wiper systems are known from the prior art. The motor units used are in particular reversible motors which are controlled by the controller. The advantage of such wiper systems is that there is no need for a complicated and bulky wiper rod system between the respective rotary axles of the wiper blades. The wiper blades can consequently be arranged in a space-saving manner and independently of one another at any locations on the windscreen that is to be wiped. Furthermore, the wiper blades can cover any predefinable wiping angle; moreover, they can be moved into a protected parked position when not in use.

SUMMARY OF THE INVENTION

One problem in such wiper devices is the problem of determining the angular positions of the wiper blades, which is necessary in order to prevent a collision of the wiper blades. In known wiper systems, the wiping areas of the individual wiper blades usually overlap. In counter-rotation or butterfly wiper systems, another problem is that during the movement of the uppermost wiper arm or of the uppermost wiper blade there must be greater acceleration in order for there to be no contact with the bottommost wiper blade. During the downward movement, the bottommost wiper arm must correspondingly move more quickly. For this reason, appropriate control of the motor units is required.

Various possibilities exist in order to be able to determine the angular position of the wiper blades. It is conceivable to use an analog rotation angle sensor, for example a magnetic field sensor with a sine or cosine output signal, on the wiper axles. However, it has been found to be disadvantageous here that the signal of the transmitter magnet is temperature-dependent. In the case of high motor temperatures or high external temperatures, this leads to an inaccurate determination of the angular position of the wiper arms, and this may lead to a collision of the wiper blades. In order to alleviate this problem, a temperature calibration is required, although this is relatively inaccurate and liable to faults.

Another possibility for determining the angular position of the wiper arms or wiper blades is the use of an incremental sensor, in particular a digital magnetic field sensor, which has a square TTL signal. However, the use of such a sensor is disadvantageous because a reference point has to be predefined in order to initiate the counting. If, for example, the wiper arms are adjusted by hand while the wiper system is switched off or while the wiper system disconnected from the power supply, for example a vehicle battery, this cannot be taken into account by an incremental sensor. When the system is started, therefore, the basis used is an incorrect angular position of the wiper arms or wiper blades.

It is therefore an object of the present invention to provide a method of operating a wiper system and a wiper system, in which the angular position of the wiper blades can be determined reliably and in a simple manner.

In order to achieve this object, a method of the type described above is proposed which is characterized in that the wiping angles of the wiper blades lie within angle zones, wherein on the one hand the angle zone within which the respective wiper blade is located is determined by means of the deflected sensor and on the other hand the angle of the respective wiper blade within the respective angle zone is determined by means of a relative sensor.

This has the advantage that, by using the absolute sensor, it can always be reliably determined within which angle zone the wiper blade or wiper arm is located. In addition, the angle of the wiper blade within the respective angle zone is also determined. The actual angular position of the respective wiper blade is consequently composed firstly of the respective angle zone and secondly of the respective angle within the angle zone. Even if the angle within an angle zone is not determined correctly, for example on account of a short interruption to the power supply, it is nevertheless possible to determine, by virtue of the angle zone within which the respective wiper blade is located, in which area of the wiper angle, that is to say in which angle zone, the respective wiper blade is located.

It is advantageous here if, when the wiper blades cross from one angle zone to a neighboring angle zone, the angle within the second angle zone is reset. Consequently, when the boundary line between two angle zones is crossed, the angle within the respective angle zone is determined starting from zero. The boundaries between in each case two angle zones thus form the reference points for determining the angle within an angle zone.

One particularly advantageous method results if, when the wiper system and/or the vehicle is started, it is determined in which angle zone the respective wiper blade is located. The angle within the respective zone is in this case not critical. Starting from the respective angle zone, control sequences are then stored in the controller which control the motor units in such a way that the wiper blades are moved into a respective neighboring angle zone without any collision between them. When the boundary line between two angle zones is crossed, in respect of the angle zone which the wiper blade enters the angle within this angle zone is then determined. Consequently, the actual angular position of the respective wiper blade is known from the moment in which a wiper blade enters a new angle zone. Such a method has the advantage that, if the vehicle is switched off or if the power supply is interrupted, even if the wiper blades or wiper arms are manually adjusted, a collision-free movement of the wiper blades is possible from the angle zone in which the respective wiper blade is located into a neighboring angle zone. The actual angular position of the wiper blades can consequently be determined shortly after the wiper system or vehicle is started, namely when the wiper blades cross from one angle zone to another angle zone.

A further, advantageous method is characterized in that the control sequences move the wiper blades in such a way that they are guided into a parked position. It is advantageous in this case if, when the vehicle is started, a check is made to ascertain in which angle zone the respective wiper blades are located. If these are not located in the predefined angle zone, for example in the parked position, the wiper blades are guided into their parked position via the stored control sequences.

The aforementioned object is moreover achieved by a wiper system which is characterized in that it is suitable for carrying out the method according to the invention.

One advantageous wiper system is characterized in that each wiper arm is provided with a sensor unit which has an absolute sensor for determining the respective angle zone and a relative sensor for determining the angle within an angle zone, wherein the boundaries between in each case two neighboring angle zones form reference points for the relative sensor. The actual angular position is consequently composed of the respective angle zone and the angle within an angle zone. When the boundaries between in each case two neighboring angle zones are crossed, the incremental sensor is set to zero and counting begins again. As a result, extremely reliable determination of the actual angular position is achieved. On account of this positionally accurate determination of the wiper blades, a collision of the wiper blades can be largely ruled out by virtue of appropriate control.

It is advantageous if the absolute sensor detects the angle zones at the pivot axle of the respective wiper arm. Since the wiping angle of a wiper blade is usually at most 160° to 180°, the absolute sensor can assign a clear angle zone to an angle range of the pivot axle.

It is advantageous here if the sensor is a digital magnetic field sensor which comprises a magnet wheel arranged on the pivot axle, which magnet wheel is scanned by two sensor elements arranged offset with respect to one another. Advantageously, four different digital output signals are produced in this arrangement, which may be as follows:

Angle zone $Z_1$: sensor element $H_1$: South and sensor element $H_2$: South;
Angle zone $Z_2$: sensor element $H_1$: North and sensor element $H_2$: South;
Angle zone $Z_3$: sensor element $H_1$: North and sensor element $H_2$: North;
Angle zone $Z_4$: sensor element $H_1$: South and sensor element $H_2$: North.

Advantageously, in such a sensor, the arrangement, number and size of the angular spacings of the polarities of the magnet wheel and the number and angular spacing of the magnetic field sensors is adapted to the wiping angle of the respective wiper blade. It has been found that, for each wiping angle, a division of the wiping angle into four zones $Z_1$, $Z_2$, $Z_3$ and $Z_4$ is sufficient. If three magnetic field sensors are provided with two polarities, at most eight angle zones can be detected.

According to the invention, it may be provided that the relative sensor detects the rotational speed of the motor shaft upstream of a gear transmission. This has the advantage that the rotational speed of the driven shaft of the motor is a multiple higher than the rotational speed of the driven shaft of the gear transmission.

It is advantageous if the relative sensor is a digital, incremental magnetic field sensor. Depending on the desired accuracy of the angle within an angle zone, an appropriately large number of signals can be detected by the magnetic field sensor for each angle zone.

One advantageous wiper system results if the wiping angles of the wiper blades lie in each case in at least three and preferably four angle zones. The individual angle zones may in this case cover different angle ranges. It is not necessary for the angle zones to be the same size. It is advantageous if the maximum wiping angles lie within one zone, that is to say if the turn-back positions of the wiper blades lie in one zone—and not on a zone boundary. A clear assignment is thus possible.

It has proven to be advantageous if the respective angle range in which a collision is possible (collision area) is divided into preferably three angle zones.

In one preferred embodiment of the invention, it is provided that in the controller the wiping angle zones of the various wiper blades are depicted in a matrix, wherein in each case one angle zone of one wiper blade and one angle zone of another wiper blade form one field of the matrix. For this purpose, for example the wiping angle with the respective angle zones of one wiper blade are plotted on an x-axis and the wiping angle with the respective angle zones of the other wiper blade are plotted on a y-axis. If the wiping angles of the two wiper blades are divided into in each case four zones, the matrix has a total of 16 angle fields.

Advantageously, the collision area of the wiper blades is superposed on the matrix. From this it can be seen in a simple manner in which fields and at which angular positions a collision of the wiper blades may occur.

Furthermore, the fields of the matrix are advantageously selected in such a way that the boundary lines of the collision area pass through a field only once. This has the advantage that the fields which are passed through by the boundary lines can be clearly divided into two sub-areas, namely into an area in which a collision takes place and an area in which no collision takes place. In this way, for each field a movement sequence can be clearly defined which controls the motor units in such a way that the wiper blades are moved without any collision.

It has been found that a particularly advantageous matrix is achieved if the collision area is covered by a total of nine fields.

Starting from any possible field in the matrix, without the angles within the respective angle zones being known, control sequences are stored which, starting from any point within a field, move the wiper blades into a neighboring field without passing through the collision area. This has the advantage that, for example when the wiper system or the vehicle is started, without a known angle within a wiping zone, the wiper blades are thus guided into a neighboring field without it being possible for a collision to take place. When the boundary line to the neighboring field is crossed, the incremental sensor then starts to determine the angle within the zone, whereupon the actual angular position of the wiper arms can be determined.

BRIEF DESCRIPTION OF THE DRAWINGS

Further advantageous refinements and details of the invention can be found in the following description in which the invention is described and explained in more detail with reference to the drawing.

In the drawing.

DETAILED DESCRIPTION

Figure 1:
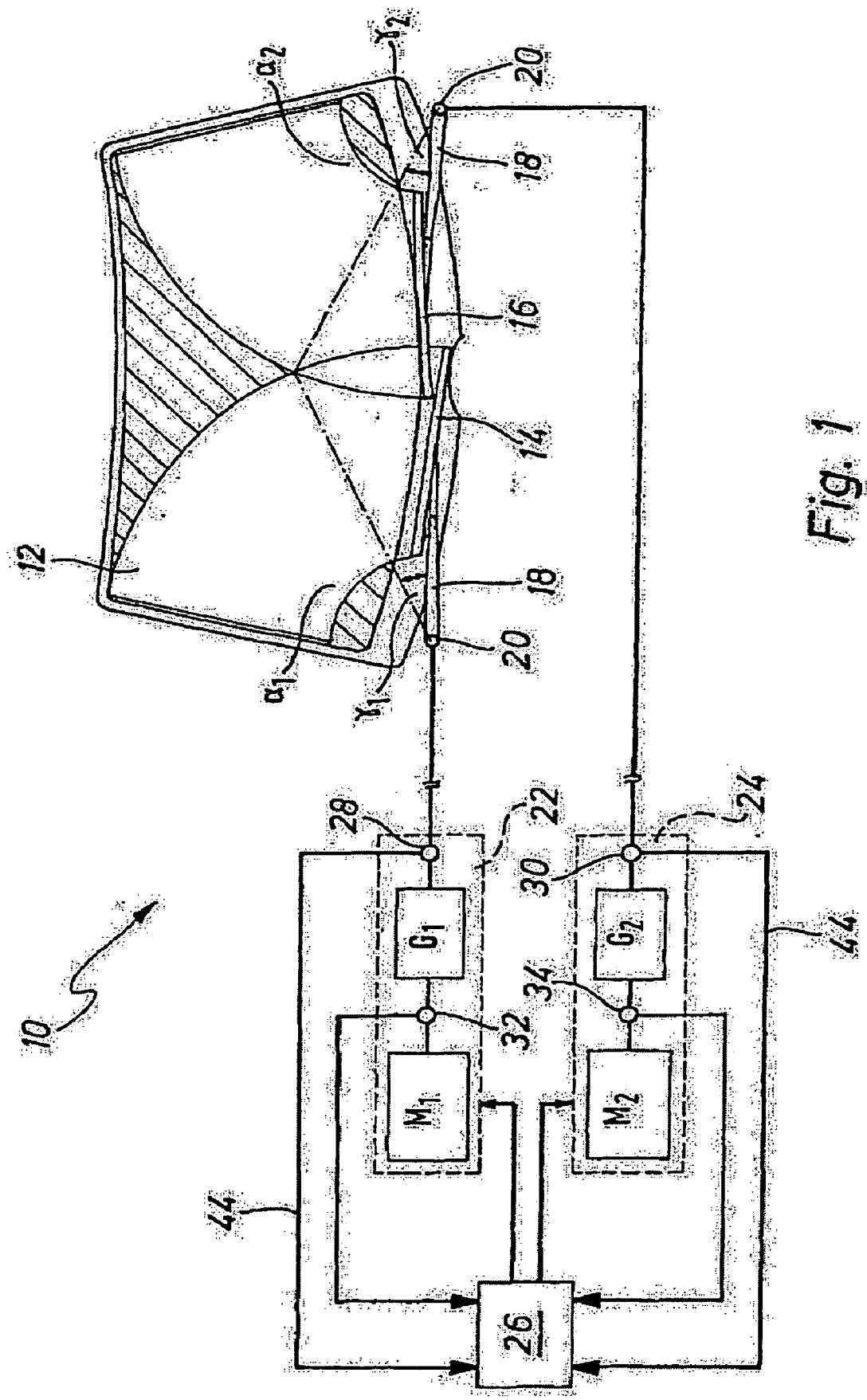
FIG. 1 shows a schematic diagram of a wiper system according to the invention.

FIG. 1 shows a wiper system 10 according to the invention. The wiper system is designed as a butterfly wiper system and has two wiper blades 14 and 16 arranged on a windscreen 12. The wiper blades 14 and 16 can be pivoted by the respective wiping angle $\alpha_1$ and $\alpha_2$ about a respective pivot axle 20 via in each case a respective wiper arm 18. In the angle range $\gamma_1$ of the wiper blade 14, there is a risk of collision with the wiper blade 16. Accordingly, in the angle range $\gamma_2$ of the wiper blade 16, there is a risk of collision with the wiper blade 14.

The wiper system 10 also comprises two motor units 22 and 24, wherein the motor unit 22 is provided to drive the wiper blade 14 and the motor unit 24 is provided to drive the wiper blade 16. The two motor units 22 and 24 in each case comprise a reversible electric motor $M_1$, $M_2$ and a gear transmission $G_1$, $G_2$ located downstream of the electric motor $M_1$, $M_2$. The motor units 22 and 24 are controlled by a controller 26 as a function of the respective angular position of the wiper blades 14, 16. In order to determine the angular position of the wiper blades 14, 16, sensor units are provided which in each case have an absolute sensor 28, 30 and a relative sensor 32, 34.

The wiping angles $\alpha_1$, and $\alpha_2$ of the two wiper blades 14, 16 in each case lie in four angle zones $Z_1$, $Z_2$, $Z_3$ and $Z_4$. The zones are selected such that the collision angles $\gamma_1$ and $\gamma_2$ in each case lie in three angle zones $Z_1$, $Z_2$ and $Z_3$ and the maximum wiping angles, or the turn-back positions of the wiper blades 14, 16, lie within the zone 4.

The absolute sensors 28, 30, which are arranged in the region of the pivot axle of the wiper arms 18, are used to determine within which angle zone $Z_1$, $Z_2$, $Z_3$ or $Z_4$ the respective wiper arm 18 or the respective wiper blade 14, 16 is located. The relative sensors 32, 34 are provided to determine the angle $\delta$ within the respective angle zone. The respective actual angular positions $\phi$ are then determined as follows: $\phi = Z + \delta$. The relative sensors 32, 34 are advantageously designed as incremental sensors which are advantageously arranged on the driven shaft of the motor or on the input shaft of the gear transmission. When a zone boundary of the zones $Z_1$ to $Z_4$ is crossed, the relative sensors are reset to zero. The signals of the respective sensor unit or of the sensors 28, 30, 32, 34 are input signals of the controller 26.

The absolute sensors 24, 28 are advantageously digital magnetic field sensors. The relative sensors 32, 34 are advantageously incremental, digital magnetic field sensors. Instead of magnetic field sensors, it is also possible to use any other type of sensor which leads to a corresponding digital measurement result.

Figure 2:
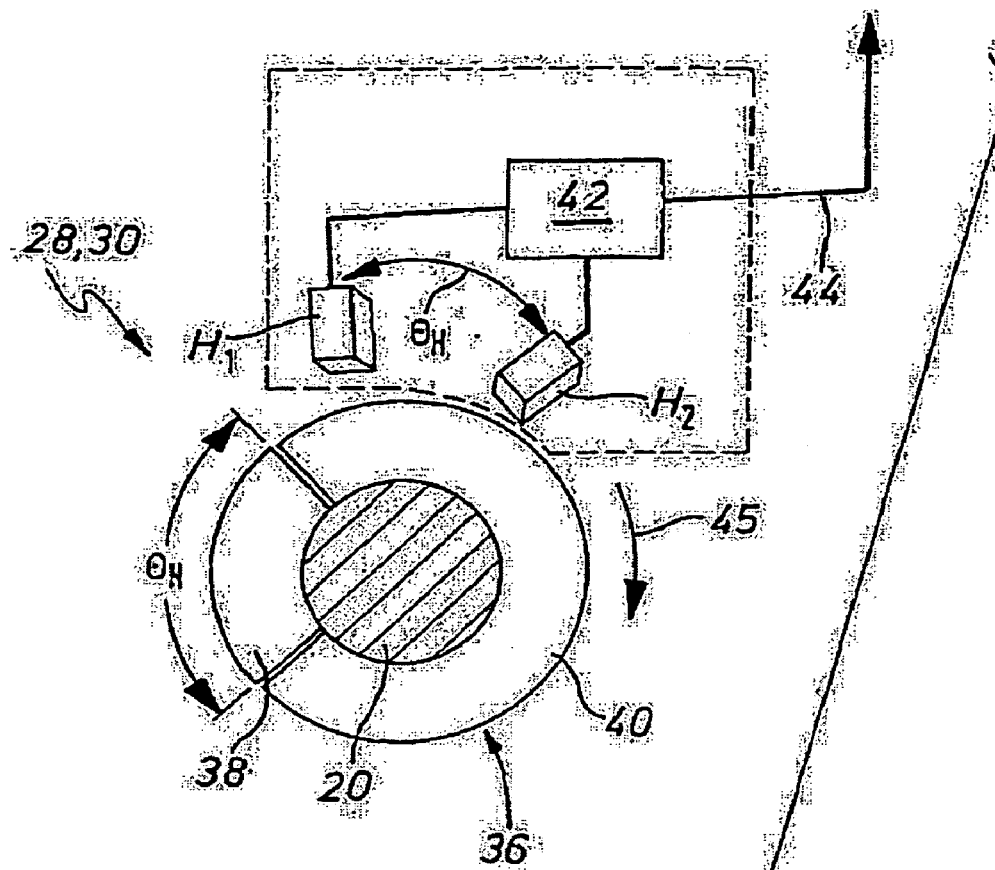
FIG. 2 shows a schematic diagram of a sensor for determining the angle zone of a wiper blade of a wiper system according to the invention with an associated table for signal evaluation.

One conceivable absolute sensor 28, 30 is shown schematically in FIG. 2. Shown in section is a pivot axle 20 which is surrounded by a magnetized magnet wheel 36. The magnet wheel has a North pole segment 38, which extends over an angle $\theta_N$ of approximately 70°, and a South pole segment 40, which extends over an angle $\theta_S$ of approximately 290°. The magnet wheel 36 is scanned by two sensor elements $H_1$ and $H_2$ which are arranged offset at an angle $\theta_H$ of approximately 20° with respect to one another. The signals detected by the sensor elements $H_1$ and $H_2$ are fed to an evaluation unit 42 which is coupled to the controller 26 via a line 44. The evaluation unit 42 evaluates the digital signals (North pole: +; South pole: −) detected by the sensor elements $H_1$ and $H_2$. From the accordingly detected signals, the respective angle zone of the pivot axle 20 and the respective angle zone of the associated wiper blade 14, 16 are determined.

It can be seen from the evaluation table shown in FIG. 2 that the wiper blade 14 or 16 is in the angle zone $Z_1$ if the sensor elements $H_1$ and $H_2$ both detect a South pole. If the axle 20 is rotated in the clockwise direction (arrow 45), the sensor element $H_1$ detects a North pole and $H_2$ detects a South pole. The corresponding wiper blade 14, 16 is located in the angle zone $Z_2$. Upon further rotation, the wiper blade passes into the zone $Z_3$ and both sensor elements $H_1$ and $H_2$ detect a North pole. In the angle zone $Z_4$, $H_1$ detects a South pole and $H_2$ detects a North pole.

Depending on the wiping angle $\alpha_1$, $\alpha_2$, the arrangement, number and size $\theta_S$, $\theta_N$ of the angle sections 38, 40 of the polarization of the magnetic wheel 36 differ from one another, and also depending on the spacing $\theta_H$ of the Hall sensors.

Figure 3:
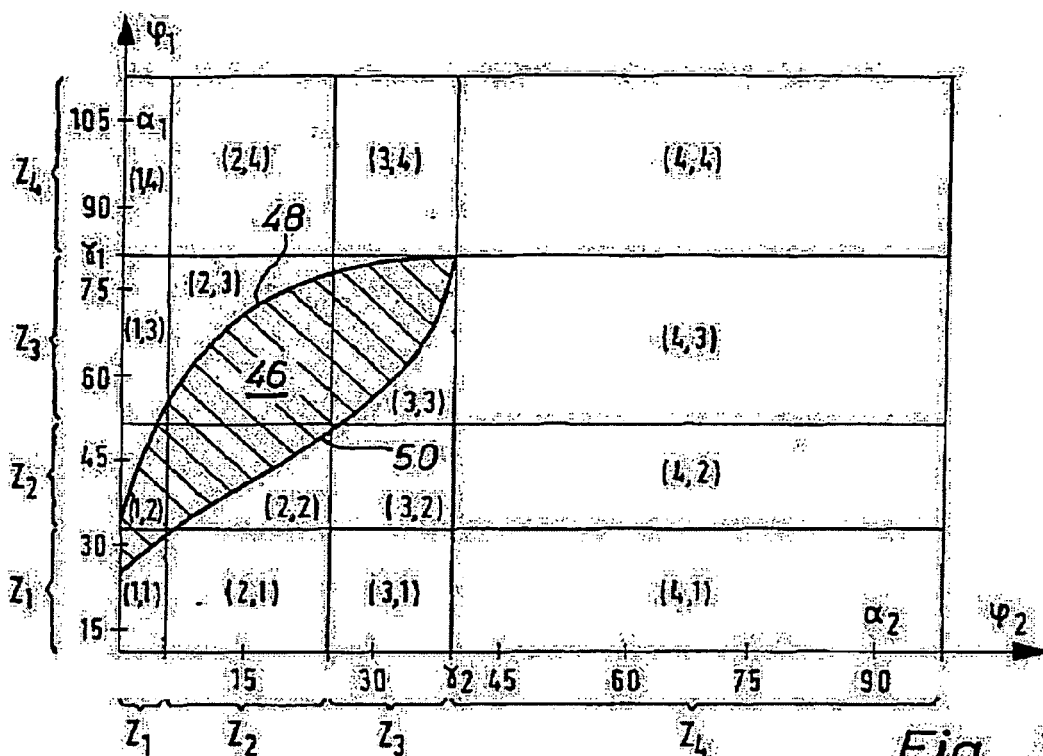
FIG. 3 shows a matrix with various angle zones of the wiping angles and associated angle fields.

FIG. 3 shows a matrix in which the angular position $\phi_1$ of the wiper blade 14 is plotted on the x-axis and the angular position $\phi_2$ is plotted on the y-axis. As can be seen from FIG. 3, the wiping angle $\alpha_1$ is approximately 105° and the wiping angle $\alpha_2$ is approximately 90°, wherein the wiping angles $\alpha_1$ and $\alpha_2$, or the turn-back positions of the wiper blades 14, 16, lie within the zones $Z_4$. The end of the zones 4 lies outwith the wiping angle or outwith the windscreen, in order that a clear distinction is possible between the end region of zone 4 and the start region of zone 3. Zone 4 of one wiper blade 14 ends at $\phi_1$: approximately 110° and zone 4 of the other wiper blade 16 ends at ($\phi_2$: approximately 95°.

If it is not possible for the end region of zone 4 to lie outwith the wiping angle $\alpha_1$, $\alpha_2$, a further Hall sensor $H_3$ may be used in order to provide a further zone, a non-collision zone. Overall, the windscreen can then be divided in such a way that each wiping angle $\alpha_1$, $\alpha_2$ can lie within a total of up to 8 zones, which then leads to a matrix of 64 fields.

The angles $\gamma_1$, and $\gamma_2$, in which a collision of the wiper blades 14 and 16 is possible, have the following values: $\gamma_2$: approximately 40°, $\gamma_1$: approximately 80°. The wiping angles $\alpha_1$, and $\alpha_2$ in each case lie in the four angle zones $Z_1$-$Z_4$. The division in this case is such that the angle zones $Z_1$-$Z_3$ divide the angles $\gamma_1$ and $\gamma_2$ into three parts. The zone $Z_4$ includes in each case the angle ranges in which no collision of the wiper blades 14, 16 can take place. In each case one zone assigned to one wiper arm and one zone assigned to the other wiper arm form a field of the matrix. Overall, 16 fields (x,y) are provided, with x=1, 2, 3, 4 and y=1, 2, 3, 4, wherein x and y are the indices of the respective angle zone $Z_1$-$Z_4$ of the respective wiper arm or wiper blade 14, 16.

FIG. 3 furthermore shows, by hatching, the collision area 46 of the two wiper blades 14, 16. Angle pairs of the angular positions $\phi_1$ and $\phi_2$ which lie in this area lead to a collision of the wiper blades 14, 16. Consequently, this area 46 is to be avoided. The area 46 is surrounded by an upper boundary line 48 and a lower boundary line 50. The fields (x,y) with x=1, 2, 3 and y=1, 2, 3 are arranged such that the collision area 46 lies within these nine fields. The remaining seven fields, which are covered by the zones $Z_4$ of the wiper blades 14, 16, do not overlap with the collision area 46.

Figure 4:
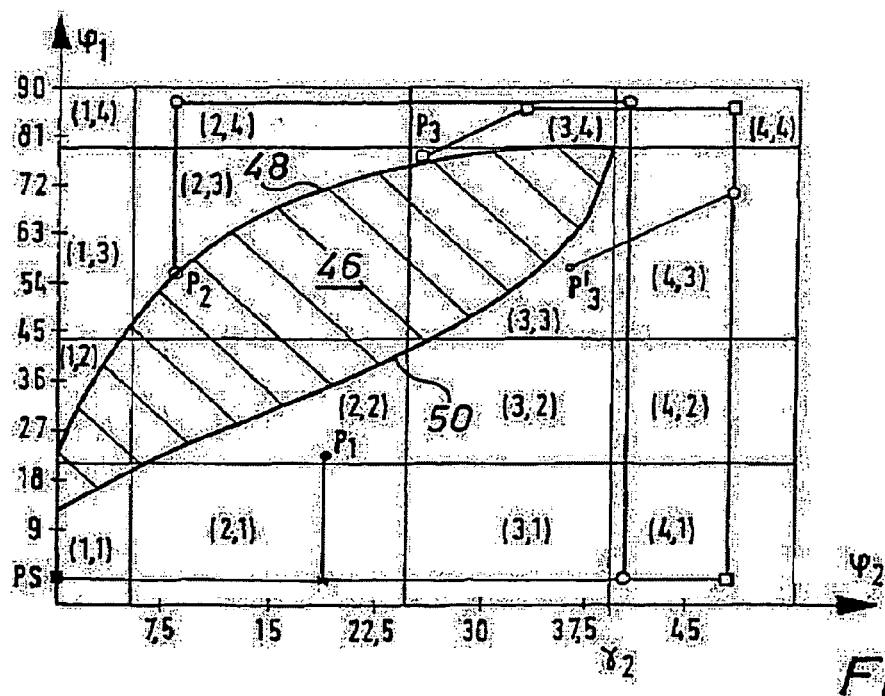
FIG. 4 shows an enlarged section of the matrix from FIG. 3 with control sequences.

By means of the two absolute sensors 28, 30, it can be determined in which field the respective wiper blade 14, 16 is located. In particular, as soon as the wiper system 10 or vehicle is started, by virtue of using the absolute sensors 28, 30 it can immediately be detected in which field the wiper blades 14, 16 lie. Starting from the respective fields, in the controller 26 control sequences are stored which result in a movement of the wiper blades 14, 16 without it being possible for a collision of the wiper blades 14, 16 to take place. FIG. 4 shows various examples in this respect.

FIG. 4 shows, in an enlarged manner, the nine fields in which the collision area 46 lies. Also shown by way of example are positions $P_1$, $P_2$, $P_3$ and $P'_3$ of angular positions in which the wiper blades 14, 16 are located for example when the wiper system 10 is started.

If it is ascertained, for example when the wiper device 10 is started, that the wiper blades 14, 16 are located in the field (2,2) in which the point $P_1$ lies, a control sequence stored in the controller 26 may be as follows:

The angle $\phi_2$ in the point $P_1$ remains constant whereas the angle $\phi_1$ of the wiper blade 14 is decreased. $P_1$ then migrates vertically downward as shown by the line in FIG. 4. As soon as the boundary line to field (2,1) is crossed, the relative sensor 32 starts to count, as a result of which the actual angular position $\phi_1=Z_1-\delta$ can be determined. Once $\phi_1$ has reached a predefined value, the angle $\phi_1$ remains constant and $\phi_2$ is decreased. In this way, the point $P_1$ moves to the left in the matrix. As soon as the boundary line between the field (2,1) and (1,1) is crossed, the relative sensor 34 starts to count, as a result of which the actual angular position $\phi_2$ is known when the boundary line is crossed. Since the collision area 46 is stored in the controller 26, the controller 26 knows that, starting from the field (2,2), the described procedure will always lead to a collision-free movement of the wiper blades 14, 16.

If it is ascertained by virtue of the absolute sensor 28 that the wiper blade 14 lies in the zone $Z_3$ when the wiper device is started, and if it is ascertained by virtue of the absolute sensor 24 when the wiper device 10 is started that the wiper blade 16 lies in the zone $Z_2$, then a point $P_2$ in the field (2,3) is produced as the starting point. In order to pass from the field (2,3) to the parked position of the wiper blades 14, 16 without it being possible for a collision of the wiper blades 14, 16 to take place, the movement sequence starting from point $P_2$ in FIG. 4 is carried out. Firstly, the angle $\phi_2$ of the wiper blade 16 is kept constant and the angle $\phi_1$, of the wiper blade 14 is increased to almost 90°. In the region of the field (2,3), the actual angular position of the angle $\phi_1$ is not yet known. Only when the boundary line from the field (2,3) to the field (2,4) is crossed is the relative sensor 32 reset to its reference value and the actual angular position $\phi_1=Z_1+Z_2+Z_3+\delta$ can be accurately determined. Once the value $\phi_1$ of almost 90° has been reached, $\phi_1$ is kept constant and the motor $M_2$ is controlled in such a way that the angular position $\phi_2$ is increased to a value greater than $\gamma_2$, for example to approximately 40°. Once this value has been reached, $\phi_2$ is kept constant and $\phi_1$ is decreased to a value of approximately 2°-3°. The wiper blade 14 has then reached its parked position. Finally, $\phi_2$ is decreased, that is to say the wiper blade 16 is also moved back into the parked position. It furthermore becomes clear from FIG. 4 that, by virtue of such a movement sequence, starting from the zone (2,3), the wiper blades are controlled in such a way that the collision area 46 is avoided; consequently, a collision of the wiper blades 14, 16 does not take place. In the case of this movement sequence, the actual angular position $\phi_2$ is accurately known only when the boundary line between fields (2,4) and (3,4) is crossed. Here, the relative sensor 34 is reset to zero and the incremental counting begins. It becomes clear from FIG. 4 that, starting from the field (2,3), by virtue of a stored movement sequence which keeps the angle $\phi_2$ constant and increases the angle $\phi_1$, a collision-free movement of the wiper blades 14, 16 can be achieved.

If, when the evaluation unit 42 is initiated by the absolute sensors 28, 30, it is ascertained that the wiper blades 14, 16 are located in the field (3,3), it is initially not known whether the wiper blades 14, 16 are located at a point $P_3$ above the upper boundary line 48 ($P_3$) or below the lower boundary line 50 ($P'_3$). This is because the field (3,3) has the disadvantage that it is passed through by both boundary lines, namely the upper boundary line 48 and the lower boundary line 50. In order nevertheless to allow a collision-free movement of the wiper blades 14, 16, a movement sequence is provided which increases the angles $\phi_1$ and $\phi_2$ of the wiper blades 14 and 16 at the same time. Starting from the point $P_3$ or from the point $P'_3$, the points $P_3$ and $P'_3$ then migrate upward at an angle along the lines shown in FIG. 4. The two lines starting from points $P_3$ and $P'_3$ in this case run parallel to one another. The inclination of the lines is selected such that, regardless of at which point within the field (3,3) the wiper blades 14, 16 lie, there is no collision of the wiper blades or the line starting from any start point $P_3$ or $P'_3$ in the field (3,3) does not intersect the collision area 46. As soon as a boundary line delimiting the field (3,3) is crossed, the corresponding relative sensor is reset to zero.

Starting from the point $P_3$, after only a few degrees the boundary line to the field (3,4) is crossed. Consequently, it is detected that the point $P_3$ is located in the upper region of the field (3,3). The angle $\phi_1$ is then kept constant and the angle $\phi_2$ is increased until the field (4,4) is reached. In order to pass to the parked position of the wiper blades 14, 16, firstly the angle $\phi_1$ is decreased to approximately 3° and then the angle $\phi_2$ is decreased to approximately 0°.

Starting from the point $P'_3$, when the boundary line to the field (4,3) is crossed, it is detected that the point $P'_3$ is located in the lower region of the field (3,3). In the field (4,3), the angle $\phi_1$ is then decreased until the field (4,1) is reached. The angle $\phi_2$ is then decreased until the parked position PS of the wiper blades 14, 16 is reached.

The described wiper system 10 and the described method of operating the wiper system 10 have the advantage in particular that, when the wiper system 10 or vehicle is started, the wiper blades 14, 16 can always be moved back to their starting position or to the parked position PS without any collision. When the wiper system 10 is initiated, it is known in which field the wiper blades 14, 16 are located. Depending on the field, a control sequence stored in the controller 26 is then used to move the wiper blades 14, 16 into their corresponding position. For instance, starting from the field (1,2), (1,3), (2,3), firstly the angle $\phi_1$ is increased until the zone $Z_4$ of the angle $\phi_1$ is reached. Then, $\phi_1$ is kept constant and the angle $\phi_2$ is increased until the zone (4,4) is reached. The angle $\phi_1$ is then decreased until the wiper blade 14 has reached the parked position. Thereafter, the wiper blade 16 is likewise moved back to the parked position by decreasing the angle $\phi_2$. The collision area 46 is consequently reliably avoided. If the wiper blades 14, 16 are located in the zone (1,1), (2,1), (2,2), (3,2), firstly the angle $\phi_1$ is decreased until the wiper blade 14 is in its parked position. Thereafter, the wiper blade 16 is likewise moved into the parked position by decreasing the angle $\phi_2$. One special case is represented by the field (3,3), since it has an upper and a lower conceivable section for the wiper blades 14, 16. Therefore, in this case, the two wiper blades 14, 16 are moved at the same time in such a way that on the one hand the angle $\phi_1$ and on the other hand the angle $\phi_2$ are increased.

All the movement sequences stored in the controller 26 have the common feature that the collision area 46 is avoided via the fields in which the collision area 46 is not present, namely the fields (1,4), (2,4), (3,4), (4,4), (4,3), (4,2), (4,1), (3,1), (2,1), (1,1).

The invention claimed is:
1. A method of operating a counter-rotation or butterfly wiper system, comprising:
driving at least two motor units independently of one another, wherein the at least two motor units are coupled to wiper arms for holding wiper blades;

controlling the at least two motor units using a controller; and determining the angular position of the wiper blades using sensor units, wherein said sensor units are connected to the controller, wherein wiping angles of the wiper blades are divided into a plurality of angle zones, wherein one of the plurality of angle zones within which a respective wiper blade is located is determined using an absolute sensor, and an angle within the one of the plurality of angle zones of the respective wiper blade is determined using a relative sensor.

2. The method as claimed in claim 1, wherein when the wiper blades cross from a first angle zone of the plurality of angle zones to a second angle zone of the plurality of angle zones, a measuring angle within the second angle zone is reset to zero.

3. The method as claimed in claim 1, characterized in that, wherein when the wiper system is started, an angle zone location of the respective wiper blade is determined, and wherein starting from the respective angle zone location, control sequences are stored in the controller which control the motor units to move the wiper blades into a neighboring angle zone of the plurality of angles zones without any collision between the wiper blades.

4. The method as claimed in claim 3, wherein the control sequences move the wiper blades into a parked position.

5. The wiper system as claimed in claim 1, wherein the absolute sensor detects the plurality of angle zones at the pivot axles of the respective wiper arms.

6. The method as claimed in claim 2, wherein when the wiper system is started, an angle zone location of the respective wiper blade is determined, and wherein, starting from the respective angle zone location, control sequences are stored in the controller which control the motor units to move the wiper blades into a neighboring angle zone of the plurality of angles zones without any collision between the wiper blades.

7. The method as claimed in claim 6, wherein the control sequences move the wiper blades into a parked position.

8. A counter-rotation or butterfly wiper system, comprising:

at least two motor units configured to be driven independently of one another coupled to wiper arms for holding wiper blade;

a controller for controlling the at least two motor units; and sensor units for determining the angular position of the wiper blades, wherein said sensor units are operatively connected to the controller, wherein the wiper system is configured to determine the angular position of the wiper blades using the sensor units by dividing wiping angles of the wiper blades into a plurality of angle zones, wherein one of the plurality of angle zones within which a respective wiper blade is located is determined using an absolute sensor, and an angle within the one of the plurality of angle zones of the respective wiper blade is determined using a relative sensor.

9. The wiper system as claimed in claim 8, wherein boundaries between a first and a second neighboring angle zone form reference points for the relative sensor by resetting a measuring angle within the second neighboring angle zone to zero when the respective wiper blade crosses the boundary from the first neighboring angle zone into the second neighboring angle zone.

10. The wiper system as claimed in claim 8, wherein the absolute sensors detect the angle zones at the pivot axles of the respective wiper arms.

11. The wiper system as claimed in claim 10, wherein the absolute sensor is a digital magnetic field sensor comprising a magnet wheel arranged on the pivot axle of each wiper arm, wherein the magnet wheel is scanned by at least two sensor elements arranged offset with respect to one another.

12. The wiper system as claimed in claim 11, wherein an arrangement, a number, and a size of angle sections of polarities of the magnet wheel, and a number and an angular spacing of the digital magnetic field sensors is adapted to the wiping angle of the respective wiper blade.

13. The wiper system as claimed in claim 8, wherein the relative sensor detects a rotational speed of a motor shaft upstream of a gear transmission.

14. The wiper system as claimed in claim 8, wherein the relative sensor is an incremental, digital magnetic field sensor.

15. The wiper system as claimed in claim 8, wherein the wiping angles of the wiper blades lie in at least three angle zones.

16. The wiper system as claimed in claim 8, wherein a collision angle range that defines angles at which the wiper blades collide is divided into three angle zones.

17. The wiper system as claimed in any of claims 8, wherein, the controller, the angle zones of the wiper blades are depicted in a matrix comprising a plurality of fields, wherein each of the plurality of fields corresponds to an angular position of the wiper blades, wherein a first angle zone associated with a first wiper blade and a first angle zone associated with a second wiper blade form one field of the matrix.

18. The wiper system as claimed in claim 17, wherein the angles forming a collision area of the wiper blades is superposed on the matrix.

19. The wiper system as claimed in claim 18, wherein the plurality of fields of the matrix that overlap with boundary lines of the collision area are passed through by a boundary line only once.

20. The wiper system as claimed in claim 18, wherein the collision area is covered by a total of nine matrix fields.

21. The wiper system as claimed in claim 18, wherein control sequences are stored which, starting from any point within one of the plurality of fields, move the wiper blades into a neighboring one of the plurality of fields without passing through the collision area.

* * * * *